United States Patent [19]

Ley et al.

[11] Patent Number: 5,025,062

[45] Date of Patent: Jun. 18, 1991

[54] COATING MATERIALS BASED ON SYNTHETIC RESIN

[75] Inventors: Gregor Ley, Wattenheim; Wolfgang Schultze, Frankenthal; Johannes Vinke, Hockenheim; Eckehardt Wistuba, Bad Durkheim, all of Fed. Rep. of Germany

[73] Assignee: BASF Aktiengesellschaft, Ludwigshafen, Fed. Rep. of Germany

[21] Appl. No.: 518,337

[22] Filed: May 3, 1990

Related U.S. Application Data

[63] Continuation of Ser. No. 321,277, Mar. 9, 1989, abandoned.

[30] Foreign Application Priority Data

Mar. 24, 1988 [DE] Fed. Rep. of Germany ....... 3809920

[51] Int. Cl.$^5$ ............................................. C08L 31/02
[52] U.S. Cl. ...................... 524/556; 524/555; 524/559; 524/560; 524/561; 524/562; 524/563; 524/564; 524/566
[58] Field of Search .............. 524/555, 556, 559, 560, 524/561, 562, 563, 564, 566

[56] References Cited

U.S. PATENT DOCUMENTS

| | | | |
|---|---|---|---|
| 2,306,139 | 12/1942 | Pollack | 526/327 |
| 4,278,767 | 7/1981 | Digiulio et al. | 521/88 |
| 4,312,797 | 1/1982 | Alhara et al. | 260/23 |
| 4,359,325 | 11/1982 | Dawans et al. | 44/62 |
| 4,370,460 | 1/1983 | Neubert et al. | 524/559 |
| 4,521,494 | 6/1985 | Mani | 428/514 |
| 4,529,772 | 7/1985 | Druschke et al. | 524/555 |
| 4,587,278 | 5/1986 | Dotzauer et al. | 524/560 |
| 4,624,973 | 11/1986 | Kuwajima et al. | 523/221 |
| 4,663,384 | 5/1987 | Penzel et al. | 524/555 |
| 4,711,944 | 12/1987 | Sherwin et al. | 526/318.42 |
| 4,783,498 | 11/1988 | Padget et al. | 524/519 |

FOREIGN PATENT DOCUMENTS

| | | |
|---|---|---|
| 0103199 | 3/1984 | European Pat. Off. . |
| 0180868 | 5/1986 | European Pat. Off. . |
| 3233840 | 3/1984 | Fed. Rep. of Germany . |
| 0491894 | 3/1938 | United Kingdom . |

OTHER PUBLICATIONS

"Webster's II New Riverside Univ. Dictionary", The Riverside Publishing Co., Boston, 1984.

*Primary Examiner*—Joseph L. Schofer
*Assistant Examiner*—R. H. Delmendo
*Attorney, Agent, or Firm*—Oblon, Spivak, McClelland, Maier & Neustadt

[57] ABSTRACT

Coating materials based on synthetic resin contain, as binders, polymers which consist of A) from 60 to 100% by weight of a tert-butyl ester of an $\alpha,\beta$-ethylenically unsaturated carboxylic acid or dicarboxylic acid of not more than 5 carbon atoms or a mixture of such tert-butyl esters, B) from 0 to 40% by weight of an acrylate or methacrylate of a nontertiary $C_1$–$C_{20}$-alkanol or a mixture of these monomers, C) from 0 to 20% by weight of vinyl chloride, vinyl acetate and/or vinyl propionate, the relationship $m_C \leq 0.5\, m_B$ being applicable to the amounts $m_B$ and $m_C$ of the monomers B and C, C) from 0 to 10% by weight of acrylic acid, methacrylic acid, acrylamide and/or methacrylamide and E) from 0 to 5% by weight of other copolymerizable monomers.

12 Claims, No Drawings

COATING MATERIALS BASED ON SYNTHETIC RESIN

This application is a continuation of application Ser. No. 07/321,277, filed on Mar. 9, 1989, now abandoned.

The present invention relates to coating materials based on synthetic resin which contain, as a binder, a polymer which consists of (A) from 60 to 100% by weight of a tert-butyl ester of an $\alpha,\beta$-ethylenically unsaturated carboxylic acid or dicarboxylic acid of not more than 5 carbon atoms or a mixture of such tert-butyl esters, (B) from 0 to 40% by weight of an acrylate or methacrylate of a nontertiary $C_1$–$C_{20}$-alkanol or a mixture of these monomers, (C) from 0 to 20% by weight of vinyl chloride, vinyl acetate and/or vinyl propionate, the relationship $m_c \leq 0.5\, m_B$ being applicable to the amounts $m_B$ and $m_c$ of the monomers B and C, (D) from 0 to 10% by weight of acrylic acid, methacrylic acid, acrylamide and/or methacrylamide and (E) from 0 to 5% by weight of other copolymerizable monomers.

Coating materials based on synthetic resin, for example paints, renders, building adhesives and filling compounds in the form of organic solutions or aqueous dispersions, are generally known.

They generally contain synthetic resins as binders, polymers based on acrylates and methacrylates having proven particularly useful with regard to their film-forming properties, light transmittance, light fastness, water resistance, resistance to hydrolysis and weather resistance.

However, the fire behavior of these binders is usually unsatisfactory, since they are relatively readily flammable and frequently drip flaming particles in the event of a fire.

Regarding the fire behavior, halogen-containing polymers, for example those based on vinyl esters and vinyl chloride, are therefore preferred, although they evolve hydrogen halides during combustion.

DE-A-32 33 840 discloses binders for building adhesives, filling compounds and renders, which consist of from 55 to 72% by weight of vinyl propionate, from 27.5 to 44.9% by weight of tert-butyl acrylate, from 0.1 to 0.5% by weight of acrylic acid or methacrylic acid and, if required, further monomers. These binders have excellent performance characteristics but are still unsatisfactory in terms of the fire behavior and the resistance to hydrolysis.

It is an object of the present invention to provide coating materials in which, on the one hand, the binder is not readily flammable after application of the said materials and neither melts nor drips flaming particles in the event of a fire, and which, on the other hand, permits the production of high-hiding and transparent coatings which in particular are resistant to hydrolysis and lightfast, water resistant and weather resistant and do not blush on prolonged exposure to water.

We have found that this object is achieved by the coating materials defined at the outset and based on synthetic resin.

We have also found that such coating materials are particularly suitable for the production of coatings which contain (a) from 5 to 40% by weight of the stated polymers in the form of a dispersion polymer (based on anhydrous material), (b) from 35 to 67% by weight of the solids usually employed for the purpose, (c) small amounts of other conventional assistants and (d) water as the residual amount.

Monomers A which are suitable for the preparation of the binders are the tert-butyl esters of acrylic acid and methacrylic acid and the mono- and di-tert-butyl esters of maleic, fumaric and itaconic acid, tert-butyl acrylate being particularly preferred because of its copolymerization properties.

These tert-butyl esters are presumably responsible for the fact that the polymer does not drip flaming particles during a fire. At high temperatures, they eliminate isobutene, initially giving a polymer which has a high content of the corresponding acid and decomposes before the melting point is reached. Since acids promote elimination of isobutene, this elimination reaction is actually accelerated by autocatalysis by the resulting carboxylic acid groups during a fire.

Particularly suitable monomers (B) are acrylates, such as methyl acrylate, ethyl acrylate, isopropyl acrylate, isobutyl acrylate, n-butyl acrylate and ethylhexyl acrylate, n- and isobutyl acrylate being preferred because they are plasticizing monomers and are particularly insensitive to hydrolysis. Examples of methacrylates are methyl methacrylate, ethyl methacrylate, isopropyl methacrylate, n-butyl methacrylate and isobutyl methacrylate, methyl methacrylate being of particular interest here.

Monomers of group (C) are concomitantly used when value is placed on particularly good fireproof properties, i.e. not only vinyl acetate and vinyl propionate but also vinyl chloride and/or vinylidene chloride, although the two last-mentioned compounds have the disadvantage that they evolve hydrogen chloride.

The monomers (D), such as methacrylic acid, acrylic acid, acrylamide and methacrylamide are preferably used if the binders are prepared by the dispersion polymerization methods, since particles of polymers containing these monomers as building blocks are particularly stable to coagulation in aqueous dispersion, owing to the hydrophilic groups.

Examples of suitable monomers (E) are styrene, acrylonitrile and vinyl versatate. Polymers having the following composition are preferred:

from 65 to 95, in particular from 65 to 80, % by weight of monomers (A), from 5 to 30, in particular from 17 to 28, % by weight of monomers (B) and from 0 to 20, in particular from 0 to 15, % by weight of monomers (D).

The polymers to be used according to the invention as binders are obtainable by conventional methods of free radical mass, solution and dispersion polymerization with the use of initiators such as azobisisobutyronitrile, dibenzoyl peroxide, hydrogen peroxide or sodium peroxodisulfate, so that further information in this respect is unnecessary.

Since the novel coating materials are generally used in the form of aqueous dispersions, it is advisable to use the binder too in this form, and it is accordingly preferably prepared as a dispersion polymer.

Emulsifiers which have proven particularly useful for this purpose are oxyethylated alkylphenols (degree of oxyethylation: 3–30; alkyl radical: $C_8$ and/or $C_9$) and/or oxyethylated fatty alcohols (degree of oxyethylation: 3-25; alkyl radical: $C_8$-$C_{25}$), which may be used alone or together with sodium salts of alkyl sulfates and oxyethylated alkylphenols which additionally carry a sulfo group.

Among the novel coating materials, such materials for stone chip render may be primarily mentioned.

They generally contain from 5 to 15, preferably from 7 to 12, % by weight of the binder in the form of a dispersion polymer (based on anhydrous material) and from 50 to 80, preferably from 55 to 70, % by weight of stone chips having a mean particle size of, preferably, from 1 to 4.5 mm (longest diameter) and small amounts of other substances, for example thickeners, wetting agents and film-forming assistants, the remainder being water.

In addition to the improved fire behavior, whereby there is no dripping of the flaming particles, these renders have hardly any tendency to blush as a result of exposure to water, i.e. due to rain or a humid atmosphere.

Further novel coating materials are paints for interior and exterior coatings, whose composition corresponds to that of the stone chip renders, except that they contain from 30 to 80, preferably from 35 to 75, % by weight of pigments and fillers instead of the stone chips.

Filling compounds which contain, for example, from 40 to 85, preferably from 50 to 80, % by weight of calcite as a filler show similar behavior.

Building adhesives which serve for embedding fabric or fastening insulating material in full heat insulation and contain about 40-80, preferably 45-75, % by weight of calcite and, if required, 5-20% by weight of cement may also be mentioned.

EXAMPLES

Below, percentages are by weight.

EXAMPLES 1 TO 5

Preparation of Vaious Dispersion Polymers

EXAMPLE 1 (General Method)

A mixture of
440 g of water,
14 g of emulsifier I,
25 g of acrylic acid,
10 g of acrylamide,
750 g of tert-butyl acrylate and
250 g of n-butyl acrylate
was first added, in the course of 3 hours at 3 hours at 85° C., to a stirred solution of
485 g of water,
0.7 g of the sodium salt of a sulfonated and oxyethylated $C_8$-alkylphenol (degree of oxyethylation 25, emulsifier I)
0.5 g of an oxyethylated $C_8$-alkylphenol (degree of oxyethylation 25, emulsifier II) and
0.4 g of sodium peroxodisulfate,
after which a solution of
150 g of water and
3.6 g of sodium peroxodisulfate
was added in the course of 3.5 hours.

After the addition of about 10 g of a roughly 1.5% strength aqueous hydrogen peroxide solution, polymerization was continued for one hour and the ready-prepared dispersion was then brought to pH 8.5 with ammonia.

The composition of the polymers is shown in Table 1, and Table 2 shows the properties of this dispersion.

TABLE 1

| % monomers | Examples | | | | (comparison) |
|---|---|---|---|---|---|
| | 1 | 2 | 3 | 4 | 5 |
| Tert-butyl acrylate | 72.5 | 46.2 | 67.6 | 67.6 | 39.8 |
| Tert-butyl methacrylate | — | 30.0 | — | — | — |
| n-Butyl acrylate | 24.2 | 19.0 | 19.3 | 14.5 | 0.2 |
| Acrylic acid | 2.4 | 3.8 | — | 2.4 | — |
| Acrylamide | 0.9 | — | — | — | — |
| Methacrylamide | — | 1.0 | 1.0 | 1.0 | — |
| Methyl methacrylate | — | — | 9.7 | — | — |
| Methacrylic acid | — | — | 2.4 | — | — |
| Vinyl propionate | — | — | — | 14.5 | 60 |

TABLE 2

| Properties | Examples | | | | (comparison) |
|---|---|---|---|---|---|
| | 1 | 2 | 3 | 4 | 5 |
| Solids content % DIN 53,189 | 49.8 | 51.2 | 50.2 | 49.5 | 55.0 |
| Light transmittance[1] | 88 | 91 | 90 | 92 | 60 |
| Viscosity (mPa.s) DIN 53,018 | 452 | 355 | 766 | 513 | 1000 |
| MFT (°C.)[2] DIN 53,787 | 8 | 15 | 10 | 8 | 15 |
| Water absorption after 24 h (%), DIN 53,495 | 7.5 | 6.5 | 7.3 | 11.1 | 22 |
| Hydrolysis test number[3] | 49 | 49 | 48 | 44 | 38 |

[1]The data for the light transmittance are based on a 0.01% strength dispersion and a path length of 25 mm. The measurement was carried out using commercial photometer and was made relative to water, which was arbitrarily assigned a LT value of 100.
[2]MFT = Minimum film-forming temperature
[3]To determine the hydrolysis test number, 10 ml of water and 50 ml of 1 N NaOH are added to 10 g of 50% strength dispersion at 50° C. for 24 hours. The sodium hydroxide solution which has not reacted in this time is then back-titrated with 1 N HCl. The test number represents the consumption of hydrochloric acid in ml.

EXAMPLE 6

Materials for the Stone Chip Renders and the Properties of the Renders Prepared Therewith Using the polymers according to Examples 1 to 5, stone chip render materials having the following composition were prepared:

| % | Component |
|---|---|
| 8.5 | Polymer, used as 50% strength dispersion |
| 35 | Calcium carbonate chips having an average particle size of 1.5 mm (longest diameter) |
| 35 | Calcium carbonate chips having a mean particle size of 2.5 mm (longest diameter) |
| 0.13 | Thickener based on cellulose |
| 0.25 | Thickener based on polyurethane |
| 0.20 | Preservative |
| 1.50 | Mineral spirit (bp. 155-185° C.) |
| 0.10 | Concentrated ammonia |
| 0.10 | Antifoam |
| 19.22 | Water |
| 100.00 | |

(a) Blushing of the render

The aforementioned render materials were applied to 20×10 cm fiber cement boards. After drying for 24 hours at room temperature, the coated boards (dry material thickness about 2.5 mm) were half immersed in water at 23° C. for 2 hours. The blushing was then evaluated. The results are shown in Table 3.

(b) Melting and decomposition of the render on heating in a flame

The boards coated according to (a) were dried for 4 days at room temperature and then placed vertically, and the inner cone of the flame of a Bunsen burner was then applied to them for 1 minute. The criterion used for evaluating melting and decomposition of the render was the extent to which the chips dropped from the layer. The results are summarized in Table 3.

(c) Dripping behavior of the binder during burning

In this test, a free polymer film (1 cm × 5 cm × 0.5 cm) produced from the dispersions according to Examples 1 to 5 was exposed to a Bunsen burner flame for 10 seconds. The behavior of the films is indicated in Table 3.

TABLE 3

Performance characteristics of the stone chip renders and of the binders

| Binder according to the Example | (a) Blushing | (b) Melting and decomposition | (c) Dripping behavior |
|---|---|---|---|
| 1 | Slight | None | Coking, no dripping |
| 2 | Very slight | None | Dropping of the stone chips — no dripping of flaming particles |
| 3 | Very slight | None | |
| 4 | Slight | Slight | |
| 5 (comparison) | Pronounced | Moderate | Sample melts slightly and exhibits slight dripping of flaming particles |

We claim:

1. A stone chip composition, comprising:
   5–15 wt. % of a polymer binder consisting of
   (A) from 60 to 100% by weight of a mono-or di-tert-butyl ester of an α,β-ethylenically unsaturated carboxylic acid or dicarboxylic acid of not more than 5 carbon atoms or a mixture thereof,
   (B) from 0 to 40% by weight of an acrylate or methacrylate of a nontertiary $C_{1-20}$-alkanol or a mixture thereof,
   (C) from 0 to 20% by weight of vinyl chloride, vinyl acetate, vinyl propionate or mixtures thereof, wherein $m_C \leq 0.5\, m_B$, wherein $m_C$ and $m_B$ are the amounts of monomers C and B respectively,
   (D) from 0 to 10% by weight of acrylic acid, methacrylic acid, acrylamide, methacrylamide and mixtures thereof, and
   (E) from 0 to 5% by weight of other copolymerizable monomers; and
   50–80 wt. % of stone chips having a mean particle size of 1–4.5 mm wherein said binder is in the form of an aqueous dispersion.

2. The composition of claim 1, wherein said composition comprises 7–12 wt. % of said polymer binder.

3. The composition of claim 1, wherein said composition comprises 55–70 wt. % stone chips.

4. The composition of claim 1, wherein said tert-butyl ester is selected from the group consisting of tert-butyl ester of acrylic acid, tert-butyl ester of methacrylic acid and mono- and di-tert-butyl esters of maleic, fumaric and itaconic acid.

5. The composition of claim 1, wherein said tert-butyl ester is tert-butyl acrylate.

6. The composition of claim 1, wherein said acrylate or methacrylate of a nontertiary alkanol is selected from the group consisting of methylacrylate, ethylacrylate, isopropylacrylate, isobutylacrylate, n-butylacrylate, ethylhexylacrylate, methylemthacrylate, ethylmethacrylate, isopropylmethacrylate, n-butylmethacrylate and isobutylmethacrylate.

7. The composition of claim 6, wherein said acrylate or methacrylate of a nontertiary alkanol is n-butylacrylate, isobutylacrylate or methylmethacrylate.

8. The composition of claim 1, comprising 5–30 wt. % monomers B.

9. The composition of claim 8, comprising 17–28 wt. % monomers B.

10. The composition of claim 1, comprising 65–95 wt. % monomers A.

11. The composition of claim 10, comprising 65–80 wt. % monomers A.

12. The composition of claim 1, wherein said other copolymerizable monomers are selected from the group consisting of styrene, acrylonitrile and vinyl versatate.

* * * * *